United States Patent
Noh et al.

(10) Patent No.: US 9,196,223 B2
(45) Date of Patent: Nov. 24, 2015

(54) DISPLAY PANEL AND DISPLAY APPARATUS COMPRISING THE SAME

(71) Applicant: SAMSUNG ELECTRONICS CO., LTD., Suwon (KR)

(72) Inventors: Jeong-dong Noh, Suwon (KR); Hyo-jae Jang, Gangneung (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 66 days.

(21) Appl. No.: 13/947,497

(22) Filed: Jul. 22, 2013

(65) Prior Publication Data

US 2014/0078027 A1    Mar. 20, 2014

(30) Foreign Application Priority Data

Sep. 14, 2012  (KR) .......................... 10-2012-0102037

(51) Int. Cl.
*G09G 5/10* (2006.01)
*G02F 1/1335* (2006.01)
*G02F 1/1362* (2006.01)
*G09G 3/32* (2006.01)

(52) U.S. Cl.
CPC ............ *G09G 5/10* (2013.01); *G02F 1/133606* (2013.01); *G02F 1/136286* (2013.01); *G09G 3/3208* (2013.01); *G02F 2001/133607* (2013.01); *G02F 2201/122* (2013.01); *G09G 2320/0223* (2013.01)

(58) Field of Classification Search
CPC .................................................... G09G 3/3233
USPC .......................................................... 345/77
See application file for complete search history.

(56) References Cited

U.S. PATENT DOCUMENTS

| | | | |
|---|---|---|---|
| 6,947,022 B2 | 9/2005 | McCartney | |
| 7,164,405 B1 | 1/2007 | Jeong et al. | |
| 7,548,225 B2 * | 6/2009 | Yeo et al. | ......................... 345/87 |
| 7,759,801 B1 * | 7/2010 | Lesea et al. | ................... 257/775 |
| 2003/0063233 A1 | 4/2003 | Takagi | |
| 2006/0290859 A1 | 12/2006 | Ko et al. | |
| 2008/0136809 A1 | 6/2008 | Lee et al. | |
| 2010/0025692 A1 * | 2/2010 | Hsiao et al. | ...................... 257/72 |
| 2013/0027643 A1 * | 1/2013 | Hirosawa | ........................ 349/99 |

OTHER PUBLICATIONS

European Search Report dated Dec. 10, 2013 in corresponding European Patent Application 13178760.8.
European Office Action dated Jun. 11, 2015 issued in corresponding European Patent Application 13 178 760.8-1904.

* cited by examiner

*Primary Examiner* — Robin Mishler
(74) *Attorney, Agent, or Firm* — Staas & Halsey LLP

(57) ABSTRACT

A display panel and a display apparatus having the display panel are disclosed. The display panel includes: a substrate having a flat panel shape; a light output layer disposed on the substrate and outputting light by an electrical drive; and a semiconductor layer including a plurality of switching elements arranged in a matrix form and switching based on a driving signal for driving the light output layer, and a plurality of lines to transmit the driving signal to the plurality of switching elements, wherein each of the lines extends with a predetermined width, a first width of the line at a central portion thereof in a lengthwise direction thereof is thicker than a second width thereof at one end portion thereof in the lengthwise direction.

19 Claims, 9 Drawing Sheets

DISPLAY PANEL AND DISPLAY APPARATUS COMPRISING THE SAME

CROSS-REFERENCE TO RELATED APPLICATIONS

This application claims priority benefit from Korean Patent Application No. 10-2012-0102037, filed on Sep. 14, 2012 in the Korean Intellectual Property Office, the disclosure of which is incorporated herein by reference.

BACKGROUND

1. Field

Apparatuses consistent with exemplary embodiments relate to a display panel and a display apparatus comprising the same, more particularly to a display panel which includes a line to transmit a driving signal and a display apparatus comprising the same.

2. Description of the Related Art

A display apparatus, for example, a TV and a monitor, includes a display panel, such as an LCD (Liquid Crystal Display) and an OLED (Organic Light-Emitting Diode). Regarding a display panel with a larger view area, a manufacturing process is important as well as technology of maintaining characteristics of the display panel is needed. For instance, in a wide-screen display panel having a width-to-length ratio of 21:9, the length of a gate line that is a scan line is at least 30% longer than in a display panel having a ratio of 16:9. In this case, as the resistance of the gate line rises, the distortion of a signal increases, thus deteriorating image quality.

SUMMARY

Additional aspects and/or advantages will be set forth in part in the description which follows and, in part, will be apparent from the description, or may be learned by practice of the disclosure.

An aspect of one or more exemplary embodiments is to provide a display panel capable of minimizing deterioration of image quality even though a screen is large and a display apparatus comprising the same.

The foregoing and/or other aspects may be achieved by providing a display panel including: a substrate having a flat panel shape; a light output layer disposed on the substrate and outputting light by an electrical drive; and a semiconductor layer including a plurality of switching elements arranged in a matrix form and switching based on a driving signal for driving the light output layer, and a plurality of lines to transmit the driving signal to the plurality of switching elements, wherein each of the lines extends with a predetermined width, a first width of the line at a central portion thereof in a lengthwise direction thereof is thicker than a second width thereof at one end portion thereof in the lengthwise direction.

The predetermined width of each line may gradually increase in the lengthwise direction from the one end portion to the central portion.

The driving signal may include a gate signal applied to a gate of the switching elements and the lines include a plurality of gate lines to transmit the gate signal.

The light output layer may include a liquid crystal layer.

The light output layer may include an organic electroluminescence (EL) layer.

The foregoing and/or other aspects may be also achieved by providing a display apparatus including: an image processing unit processing an image signal; and a display unit including a display panel displaying an image based on the image signal, wherein the display panel includes a substrate having a flat panel shape; a light output layer disposed on the substrate and outputting light by an electrical drive; and a semiconductor layer including a plurality of switching elements arranged in a matrix form and switching based on a driving signal for driving the light output layer, and a plurality of lines to transmit the driving signal to the plurality of switching elements, wherein each of the lines extends with a predetermined width, a first width of the line at a central portion thereof in a lengthwise direction thereof is thicker than a second width thereof at one end portion thereof in the lengthwise direction.

The predetermined width of each line may gradually increase in the lengthwise direction from the one end portion to the central portion.

The driving signal may include a gate signal applied to a gate of the switching elements and the lines include a plurality of gate lines to transmit the gate signal.

The light output layer may include a liquid crystal layer.

The display unit may further include a light source unit providing light and a light guide plate guiding the light provided from the light source unit to be emitted to the display panel.

The light guide plate may include a pattern to compensate for variations in light transmittance due to difference in width between the central portion and the end portion of the lines.

The image processing unit may output the image signal with brightness of a corresponding portion of an image adjusted so as to compensate for variations in light transmittance due to difference in width between the central portion and the end portion of the lines.

The light output layer may include an organic electroluminescence (EL) layer.

As described above, according to one or more exemplary embodiments, even though a display panel has a large screen, deterioration of image quality in the display panel may be minimized.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
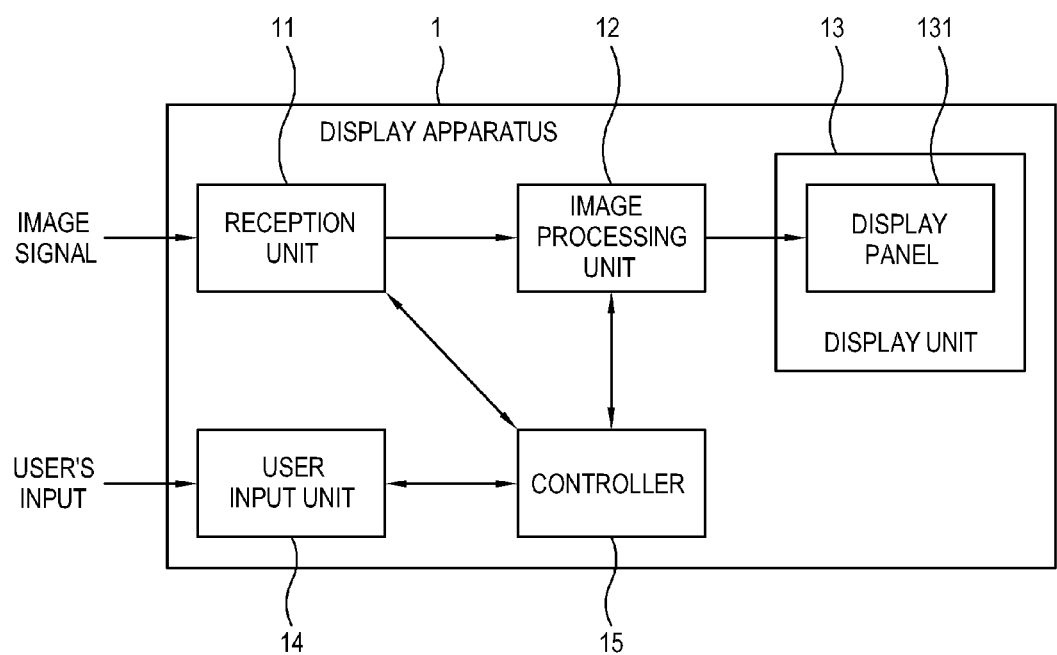
FIG. 1 is a block diagram illustrating a configuration of a display apparatus according to an exemplary embodiment.

Hereinafter, exemplary embodiments will be described in detail with reference to accompanying drawings. FIG. 1 is a block diagram illustrating a configuration of a display apparatus according to an exemplary embodiment. The display apparatus 1 may be configured as a TV, a monitor, or the like and include a reception unit 11, an image processing unit 12, a display unit 13, a user input unit 14, and a controller 15. The reception unit 11 receives an image signal. The reception unit 11 may receive a broadcast signal from a broadcast signal transmission unit (not shown), for example, a TV broadcast signal, as an image signal, receive an image signal from an imaging device, such as a DVD player and a BD player, receive an image signal from a PC, receive an image signal from mobile equipment or mobile device, such as a smartphone and a smart pad, receive an image signal through a network, such as the Internet, or receive image content stored in a storage medium, such as a USB storage medium, as an image signal.

The image processing unit 12 processes the image signal received by the reception unit 11 to display an image. The display unit 13 displays an image based on the image signal processed by the image processing unit 12. The display unit 13 may use any mode of displaying an image, for example, a LCD, LED, OLED, or the like, without being particularly limited. The display unit 13 includes a display panel 131 having characteristics based on a display mode, which will be described.

The user input unit 14 receives a user's input and may include a remote control reception unit receiving a remote control signal including a user's input from a remote control and a manipulation button or a touch panel for a user's direct input.

The controller 15 controls the display apparatus 1 overall and controls the image processing unit 12 to display an image on the display unit 13. The display apparatus 1 further includes a nonvolatile memory (not shown), such as a flash memory or a hard disk, to store a program needed for an operation of the controller 15 and data. The program needed for the operation of the controller 15 includes an operating system (OS) and an application.

Figure 2:
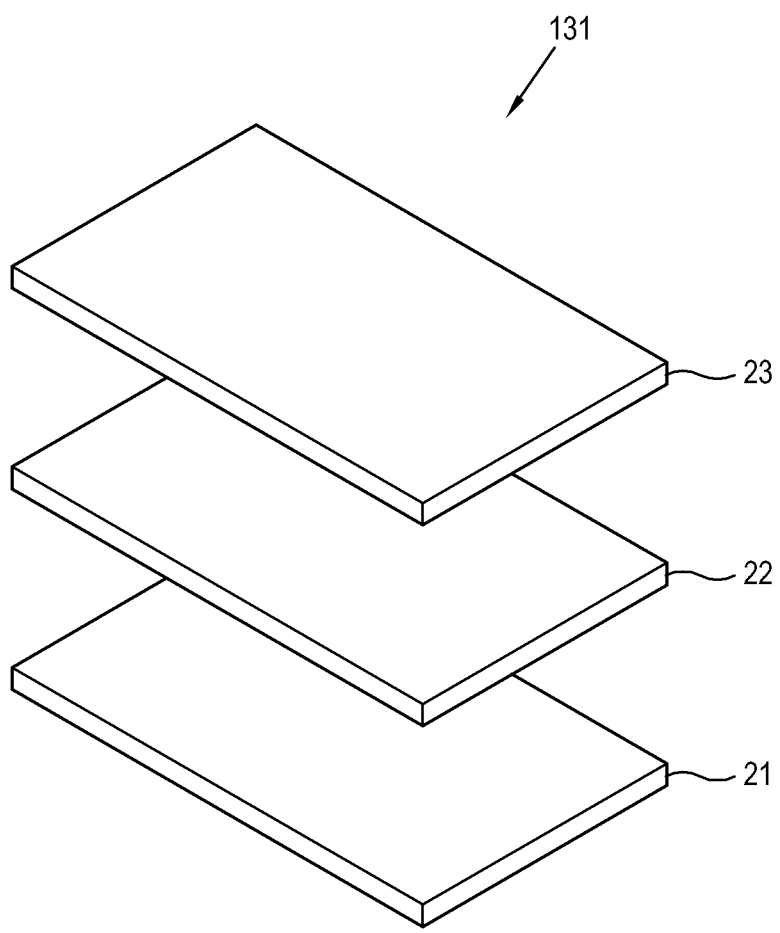
FIG. 2 illustrates a structure of a display panel according to an exemplary embodiment.

FIG. 2 illustrates a structure of the display panel 131 according to an exemplary embodiment. The display panel 131 includes a substrate 21, a semiconductor layer 22, and a light output layer 23. The substrate 21 has a flat panel shape of silicone materials, and the semiconductor layer 22 and the light output layer 23 are stacked on the substrate 21. The light output layer 23 outputs light according to control of an electrical driving signal applied by the semiconductor layer 22. A type of the light output layer 23 is determined based on a display mode of the display unit 13. For example, in an LCD, the light output layer 23 may be configured as a liquid crystal layer. Alternatively, in an OLED, the light output layer 23 may be configured as an organic electroluminescence (EL) layer. The liquid crystal layer outputs light by selectively transmitting light from a light source unit 72 in FIG. 7. The organic EL layer outputs light by emitting light based on an applied signal.

Figure 3:
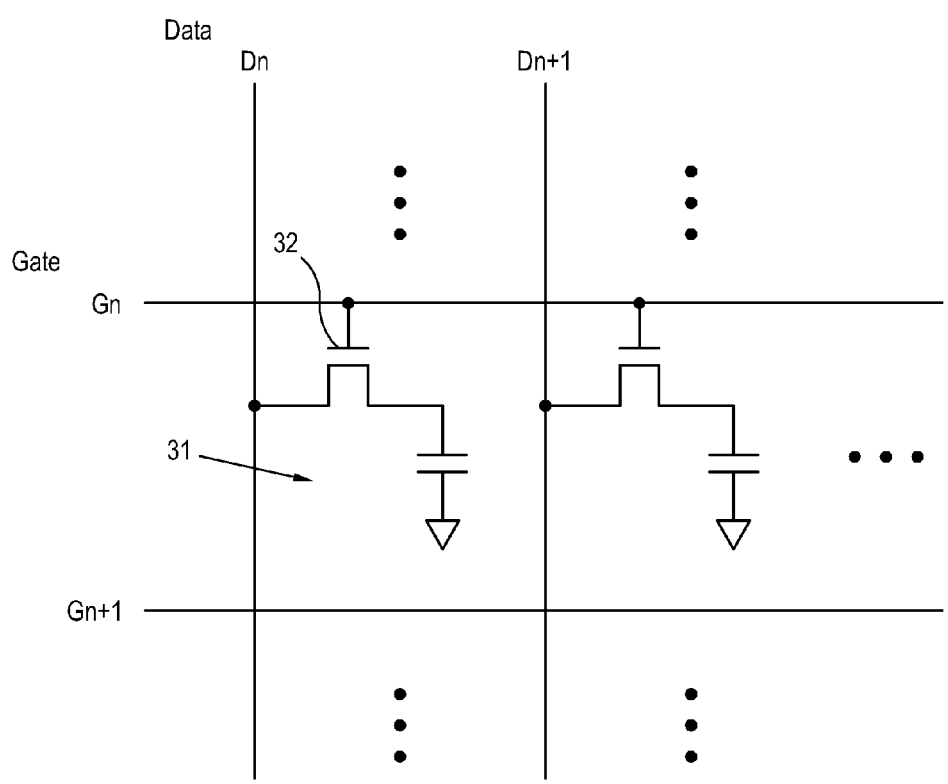
FIG. 3 illustrates an equivalent circuit of a semiconductor layer according to an exemplary embodiment.

The semiconductor layer 22 is arranged in a matrix form corresponding to a plurality of pixels of an image displayed on the display unit 13 and drives the light output layer 23 by receiving a driving signal. FIG. 3 illustrates an equivalent circuit of the semiconductor 22 layer according to an exemplary embodiment. The semiconductor layer 22 is provided corresponding to each pixel 31 and includes a plurality of switching elements 32 switching based on a driving signal for driving the light output layer 23. The switching elements 32 may be configured as a thin film transistor (TFT).

Further, the semiconductor layer 22 includes a plurality of lines Gn, Gn+1, etc. and Dn, Dn+1, etc. to transmit the driving signal to drive the light output layer 23. The driving signal includes a gate signal and a data signal, and the plurality of lines Gn, Gn+1, etc. and Dn, Dn+1, etc. include gate lines Gn, Gn+1, etc. to transmit the gate signal and data lines Dn, Dn+1, etc. to transmit the data signal. The display panel 131 further includes a driver circuit (not shown) to output the driving signal to the plurality of lines Gn, Gn+1, etc. and Dn, Dn+1, etc. based on an image signal.

Although not shown, the display panel 131 may further include a color filter to determine a color of light output from the light output unit 23 and a polarizing layer to polarize the output light.

Figure 4:
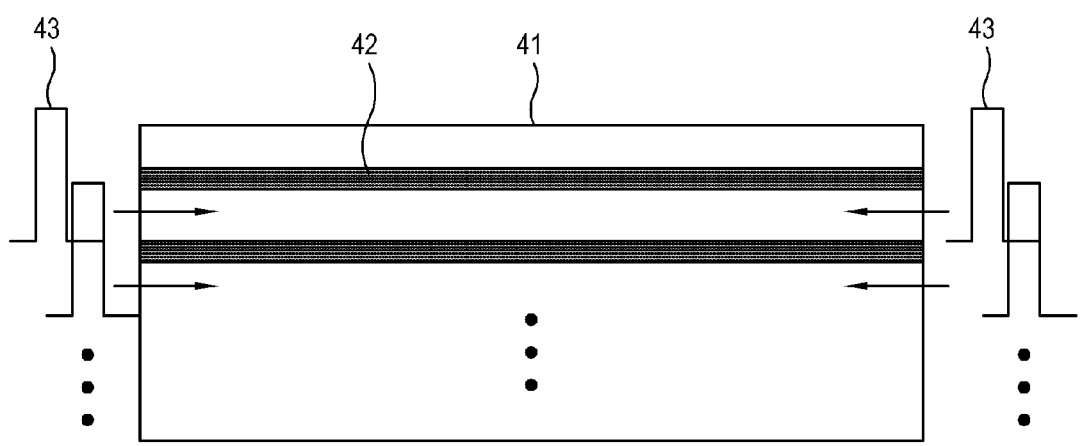
FIG. 4 illustrates a gate line according to a related art.

FIG. 4 illustrates a gate line according to a related art. The gate line 42 in a semiconductor layer 41 has a predetermined width and extends across the semiconductor layer 41. The gate line 42 receives a gate signal 43 that is a driving signal from a driver circuit from opposite ends thereof. The gate line 42 shown in FIG. 4 has a constant width in a lengthwise direction.

Figure 5:
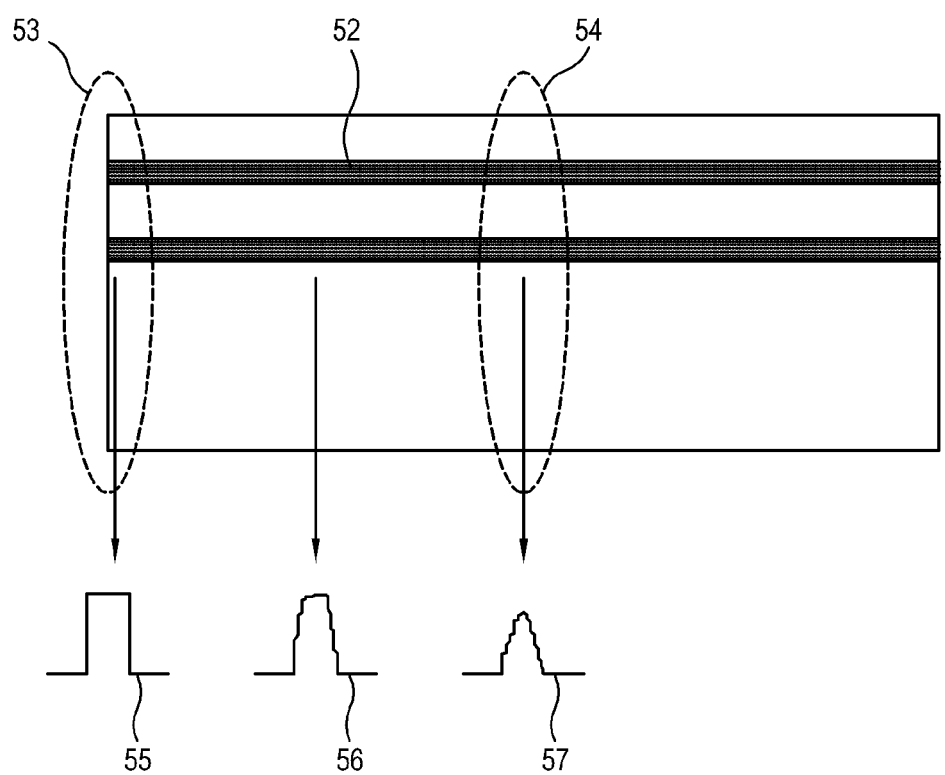
FIG. 5 illustrates distortion of a gate signal according to a related art.

As a length of the gate line 42 increases, the driving signal may be distorted due to increase of resistance of the gate line 42. FIG. 5 illustrates distortion of a gate signal according to a related art. As shown in FIG. 5, since the gate signal is gradually influenced by the resistance of the gate line 52 as the gate signal is transmitted from an end portion 53 of the gate line 52 to a central portion 54, waveforms 55, 56 and 57 of the gate signal are more distorted from the end portion 53 of the gate line 52 to the central portion 54. When the gate signal of the gate line 52 is distorted, difference in charging rate occurs based on a portion of the gate line 52, causing deterioration in image quality.

Figure 6:
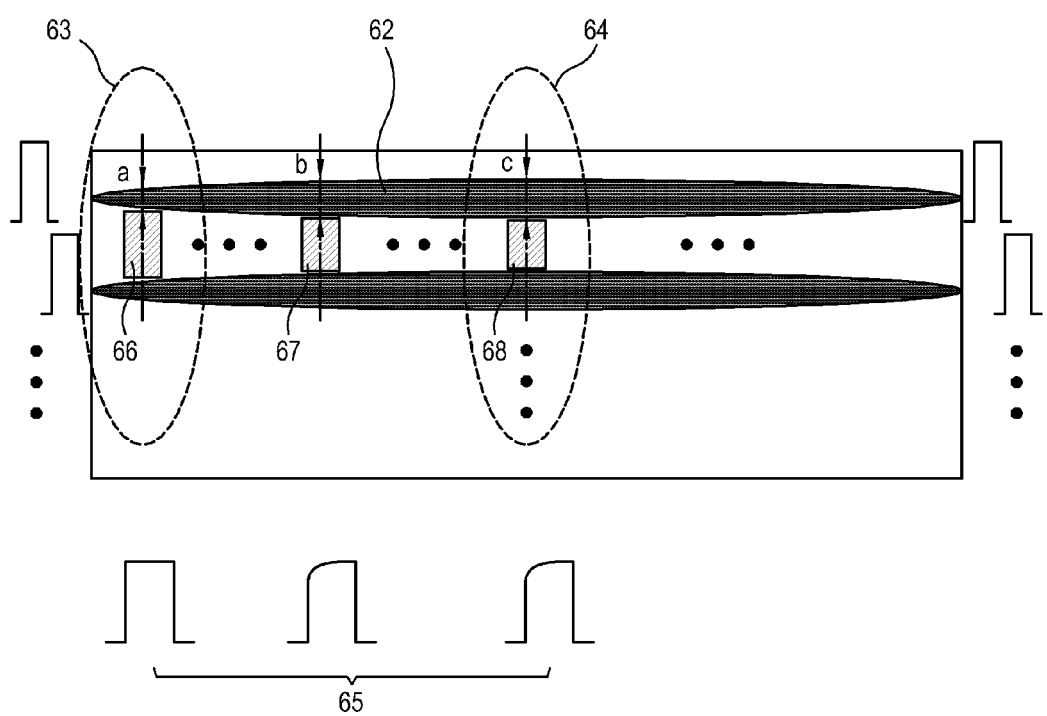
FIG. 6 illustrates a gate line according to an exemplary embodiment.

FIG. 6 illustrates a gate line according to an exemplary embodiment. The gate line 62 of an embodiment has a thickness increasing in a lengthwise direction of the gate line 62 from an end portion 63 to a central portion 64. That is, defining a width of the gate line 62 at the end portion 63 as a, a width thereof at the central portion 64 as c, and a width thereof at a portion between the end portion 63 and the central portion 64 as b. The width c is greater than the width b which is greater than the width a as shown in FIG. 6. When the thickness of the gate line 62 increases, resistance thereof decreases, thus less affecting a gate signal flowing in the gate line 62. Thus, distortion of a waveform 65 of the gate signal may be minimized. The thickness of the gate line 62 may be adjusted considering the distortion of the waveform 65 of the gate signal. For example, the thickness of the gate line 62 at the end portion 63 may be 30 to 50% of the width thereof at the central portion 64.

Referring to FIG. 6, when the width of the gate line 62 changes, sizes of pixel regions 66 to 68 may also change accordingly. In an embodiment, the pixel regions 66 to 68 refer to an area where light is transmitted through the semiconductor layer 41. As shown in FIG. 6, the sizes of the pixel regions 66 to 68 gradually decrease from the end portion 63 to the central portion 64. Accordingly, an extent of transmission of light through the semiconductor layer 41 may gradually decrease from the end portion 63 to the central portion 64.

Figure 7:
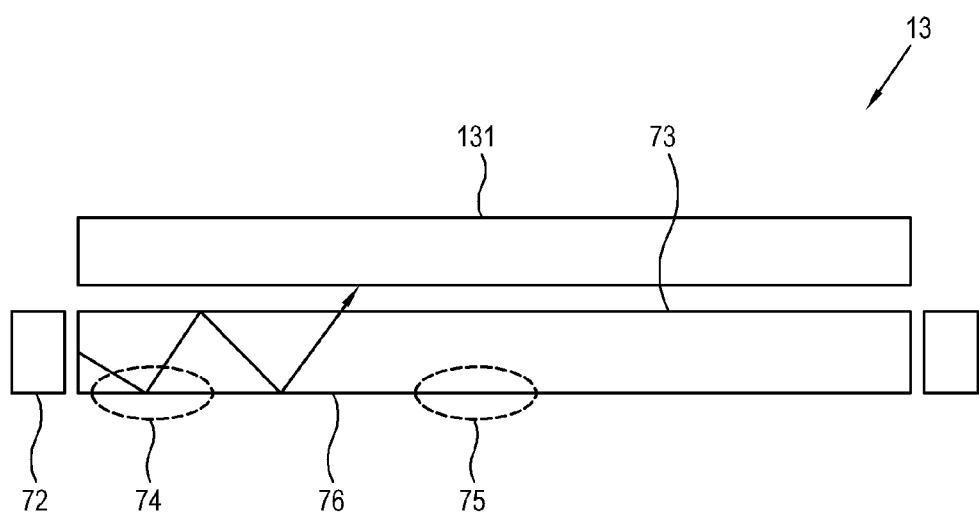
FIG. 7 illustrates a cross section of a display unit according to an exemplary embodiment.
Figure 8:
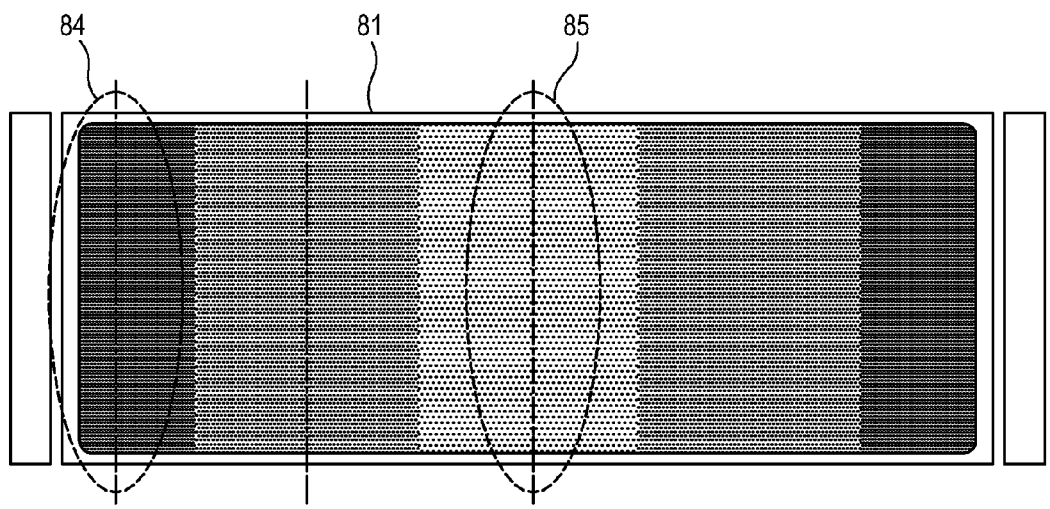
FIG. 8 is a plan view of a light guide plate, viewed from a display panel according to an exemplary embodiment.

According to an embodiment, variations in the extent of light transmission of the semiconductor layer 41 depending on a portion of the gate line 62 described above are corrected. FIG. 7 illustrates a cross section of the display unit 13 according to an exemplary embodiment. As shown in FIG. 7, the display unit 13 according to an embodiment further includes a light source unit 72 and a light guide plate 73. The light source unit 72 provides light to the display panel 131. The light source unit 72 may be configured as a fluorescent lamp, a light emitting diode (LED), or the like and be disposed on a lateral side of the light guide plate 73. The light guide plate 73 guides light from the light source unit 72 to be transmitted to the display panel 131. The light guide plate 73 includes a pattern to refract the light from the light source unit 72 so that the light is evenly transmitted to the display panel 131. The pattern may be disposed on a bottom surface 76 of the light guide plate 73 and be formed by various methods, for example, etching and dotting. The pattern is provided to compensate for reduction in the extent of transmission of light due to decrease in the sizes of the pixel regions 66 to 68 illustrated in FIG. 6. That is, the pattern of the light guide plate 73 is provided to increase output brightness of the light guide plate 73 from a region 74 corresponding to the end portion 63 of the gate line 62 to a region 75 corresponding to the central portion 64 of the gate line 62. FIG. 8 is a plan view of a light guide plate 81, viewed from the display panel 131 according to an exemplary embodiment. As shown in FIG. 8, output brightness of the light guide plate 81 increases from a region 84 corresponding to the end portion 63 of the gate line 62 to a region 85 corresponding to the central portion 64 of the gate line 62.

Figure 9:
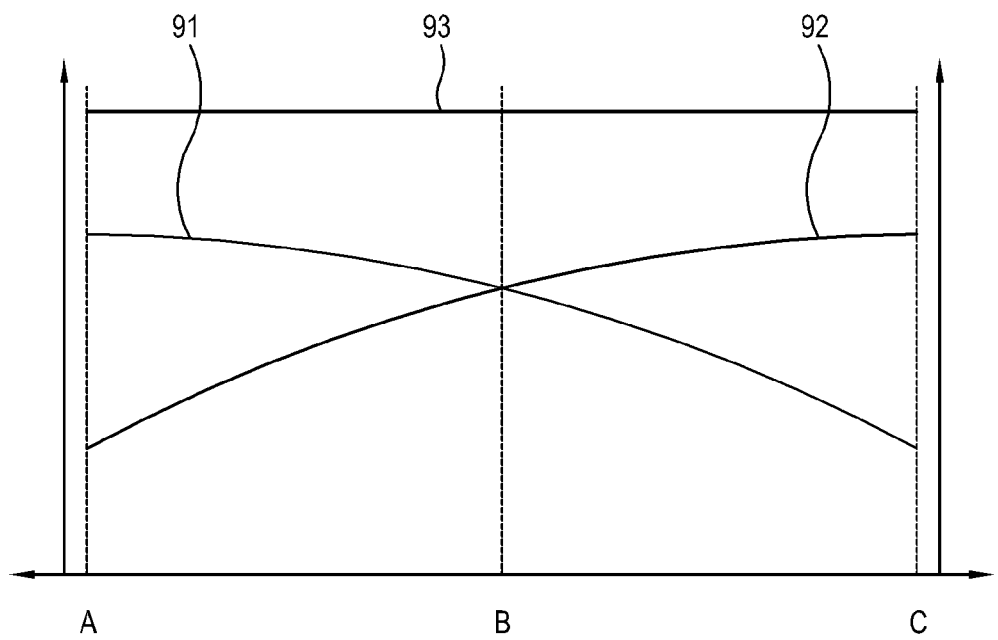
FIG. 9 is a graph illustrating a size of a pixel region, output brightness of a light guide plate, and overall transmittance based on a region of the display unit according to an exemplary embodiment.

As described above, by adjusting the pattern of the light guide plate 73, overall transmittance of the display unit 13 is constant regardless of a region of the display unit 131. FIG. 9 is a graph illustrating a size of a pixel region, output brightness of a light guide plate, and overall transmittance based on a region of the display unit 13. In the graph of FIGS. 9, A, B, and C refer to regions corresponding to the three portions a, b, and c of the gate line 62 shown in FIG. 6, respectively. Referring to FIG. 9, from a region A to a region C, that is, from the end portion 63 of the gate line 62 to the central portion 64 of the gate line 62, the sizes of the pixel regions 66 to 68 gradually decrease (see 91) while the output brightness of the light guide plate 73 gradually increases (see 92). However, reduction in extent of light transmittance due to the decrease in the sizes of the pixel regions 66 to 68 is offset by the increase in the output brightness of the light guide plate 73, so that the overall transmittance 93 of the display unit 13 is constant regardless of the regions thereof.

According to another exemplary embodiment, instead of a gate line, a width of a data line may be adjusted. Alternatively, instead of the light guide plate, the image processing apparatus 12 adjusts brightness of an image based on a region thereof, thereby compensating for the reduction in the extent of light transmittance due to the decrease in the sizes of the pixel regions 66 to 68.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. A display panel comprising:
a substrate having a flat panel shape;
a light output layer disposed on the substrate and outputting light by an electrical drive; and
a semiconductor layer comprising a plurality of switching elements arranged in a matrix form and switching based on a driving signal to drive the light output layer, and a plurality of lines to transmit the driving signal to the plurality of switching elements,
wherein at least one line extends from one end portion to the other end portion and has a width at a central portion larger than widths at both end portions, and
wherein a width of the at least one line gradually increases from the both end portions to the central portion.

2. The display panel of claim 1, wherein the driving signal comprises a gate signal applied to a gate of the switching elements and the lines comprise a plurality of gate lines to transmit the gate signal.

3. The display panel of claim 1, wherein the light output layer comprises a liquid crystal layer.

4. The display panel of claim 1, wherein the light output layer comprises an organic electroluminescence (EL) layer.

5. A display apparatus comprising:
an image processing unit processing an image signal; and
a display unit comprising a display panel displaying an image based on the image signal,
wherein the display panel comprises:
a substrate having a flat panel shape;
a light output layer disposed on the substrate and outputting light by an electrical drive; and
a semiconductor layer comprising a plurality of switching elements arranged in a matrix form and switching based on a driving signal to drive the light output layer, and a plurality of lines to transmit the driving signal to the plurality of switching elements,
wherein at least one line extends from one end portion to the other end portion and has a width at a central portion larger than widths at both end portions, and
wherein a width of the at least one line gradually increases from the both end portions to the central portion.

6. The display apparatus of claim 5, wherein the driving signal comprises a gate signal applied to a gate of the switching elements and the lines comprise a plurality of gate lines to transmit the gate signal.

7. The display apparatus of claim 5, wherein the light output layer comprises a liquid crystal layer.

8. The display apparatus of claim 7, wherein the display unit further comprises a light source unit providing light and a light guide plate guiding the light provided from the light source unit to be emitted to the display panel.

9. The display apparatus of claim 8, wherein the light guide plate comprises a pattern to compensate for variations in light transmittance due to difference in width between the central portion and the end portion of the lines.

10. The display apparatus of claim 8, wherein the image processing unit outputs the image signal with brightness of a corresponding portion of an image adjusted so as to compensate for variations in light transmittance due to difference in width between the central portion and the end portion of the lines.

11. The display apparatus of claim 5, wherein the light output layer comprises an organic electroluminescence (EL) layer.

12. The display panel of claim 1, further comprising a color filter to determine a color of the light output from the light output layer and a polarizing layer to polarize the output light.

13. The display apparatus of claim 5, wherein the display panel further comprises a color filter to determine a color of the light output from the light output layer and a polarizing layer to polarize the output light.

14. The display panel of claim 1, wherein the width of the at least one line gradually decreases from the central portion to the both end portions.

15. The display panel of claim 1, wherein one of the widths at end portions is about 30 to 50% of the width at the central portion.

16. The display apparatus of claim 5, wherein the width of the at least one line gradually decreases from the central portion to the both end portion.

17. The display apparatus of claim 5, wherein one of the widths at the end portions is about 30 to 50% of the width at the central portion.

18. The display panel of claim 1, wherein the driving signal comprises a data signal applied to the switching elements and the lines comprise a plurality of data lines to transmit the data signal.

19. The display apparatus of claim 5, wherein the driving signal comprises a data signal applied to the switching elements and the lines comprise a plurality of data lines to transmit the data signal.

* * * * *

UNITED STATES PATENT AND TRADEMARK OFFICE
CERTIFICATE OF CORRECTION

| | | |
|---|---|---|
| PATENT NO. | : 9,196,223 B2 | Page 1 of 1 |
| APPLICATION NO. | : 13/947497 | |
| DATED | : November 24, 2015 | |
| INVENTOR(S) | : Jeong-dong Noh et al. | |

It is certified that error appears in the above-identified patent and that said Letters Patent is hereby corrected as shown below:

In the claims,

Claim 16, Column 6, Line 67 delete "portion." and insert -- portions. --, therefor.

Signed and Sealed this
Twenty-second Day of March, 2016

Michelle K. Lee
*Director of the United States Patent and Trademark Office*